(12) United States Patent
Kato et al.

(10) Patent No.: US 8,138,894 B2
(45) Date of Patent: Mar. 20, 2012

(54) VEHICLE CONTROL SYSTEM AND METHOD, AND COMPONENT DEVICES

(75) Inventors: Shinichiro Kato, Kariya (JP); Masahiro Sugiura, Takahama (JP); Kazuhiro Nakashima, Anjo (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1106 days.

(21) Appl. No.: 11/972,381

(22) Filed: Jan. 10, 2008

(65) Prior Publication Data

US 2008/0169898 A1 Jul. 17, 2008

(30) Foreign Application Priority Data

Jan. 17, 2007 (JP) .................................. 2007-8501

(51) Int. Cl.
G05B 19/00 (2006.01)
G08C 19/12 (2006.01)
H04B 7/00 (2006.01)

(52) U.S. Cl. ................. 340/12.28; 340/12.22; 340/5.61; 340/5.6; 340/13.27; 455/509

(58) Field of Classification Search .................... None
See application file for complete search history.

(56) References Cited

U.S. PATENT DOCUMENTS

| | | | | |
|---|---|---|---|---|
| 5,764,697 A | * | 6/1998 | Sakuma et al. | 375/239 |
| 5,903,226 A | * | 5/1999 | Suman et al. | 340/12.28 |
| 6,005,508 A | * | 12/1999 | Tsui | 341/173 |
| 6,323,566 B1 | * | 11/2001 | Meier | 307/10.2 |
| 6,801,134 B1 | * | 10/2004 | Juzswik | 340/12.51 |
| 2006/0202798 A1 | * | 9/2006 | Baumgartner et al. | 340/5.61 |
| 2008/0174446 A1 | * | 7/2008 | Ghabra et al. | 340/825.01 |

FOREIGN PATENT DOCUMENTS

| | | |
|---|---|---|
| AU | 763156 | 11/1999 |
| EP | 1 082 712 | 11/1999 |
| EP | 1 362 753 | 11/2003 |
| JP | U-2-91864 | 7/1990 |
| JP | 4-315681 | 6/1992 |
| JP | 2001-349109 | 12/2001 |
| JP | A-2004-162521 | 6/2004 |
| JP | A-2005-299305 | 10/2005 |

OTHER PUBLICATIONS

U.S. Appl. No. 11/840,733, Noriaki Okada et al., filed Aug. 17, 2007, (JP No. 2006-241581).
U.S. Appl. No. 11/907,449, Noriaki Okada et al., filed Oct. 12, 2007, (JP No. 2006-282647).
German Office Action dated Nov. 19, 2009, issued in counterpart German Application No. 10 2008 004 240.4-51, with English translation.
Japanese Office Action dated Nov. 11, 2008, issued in counterpart Japanese Application No. 20007-008501, with English translation.

* cited by examiner

Primary Examiner — Daniel Wu
Assistant Examiner — Fekadeselassie Girma
(74) Attorney, Agent, or Firm — Nixon & Vanderhye PC

(57) ABSTRACT

An in-vehicle device notifies a mobile device of a frequency channel which has been stored in its memory unit, and sets the notified channel to a reception channel. The mobile device transmits a reply signal through the channel notified from the in-vehicle device. When the in-vehicle device determines that a code included in the received reply signal is identical with a code specific to a vehicle, the in-vehicle device stores the channel used for receiving the reply signal in its memory unit. As a result, each communication is conducted through the same channel, which enabled the successful communication previously, thereby enhancing the certainty of communication.

13 Claims, 5 Drawing Sheets

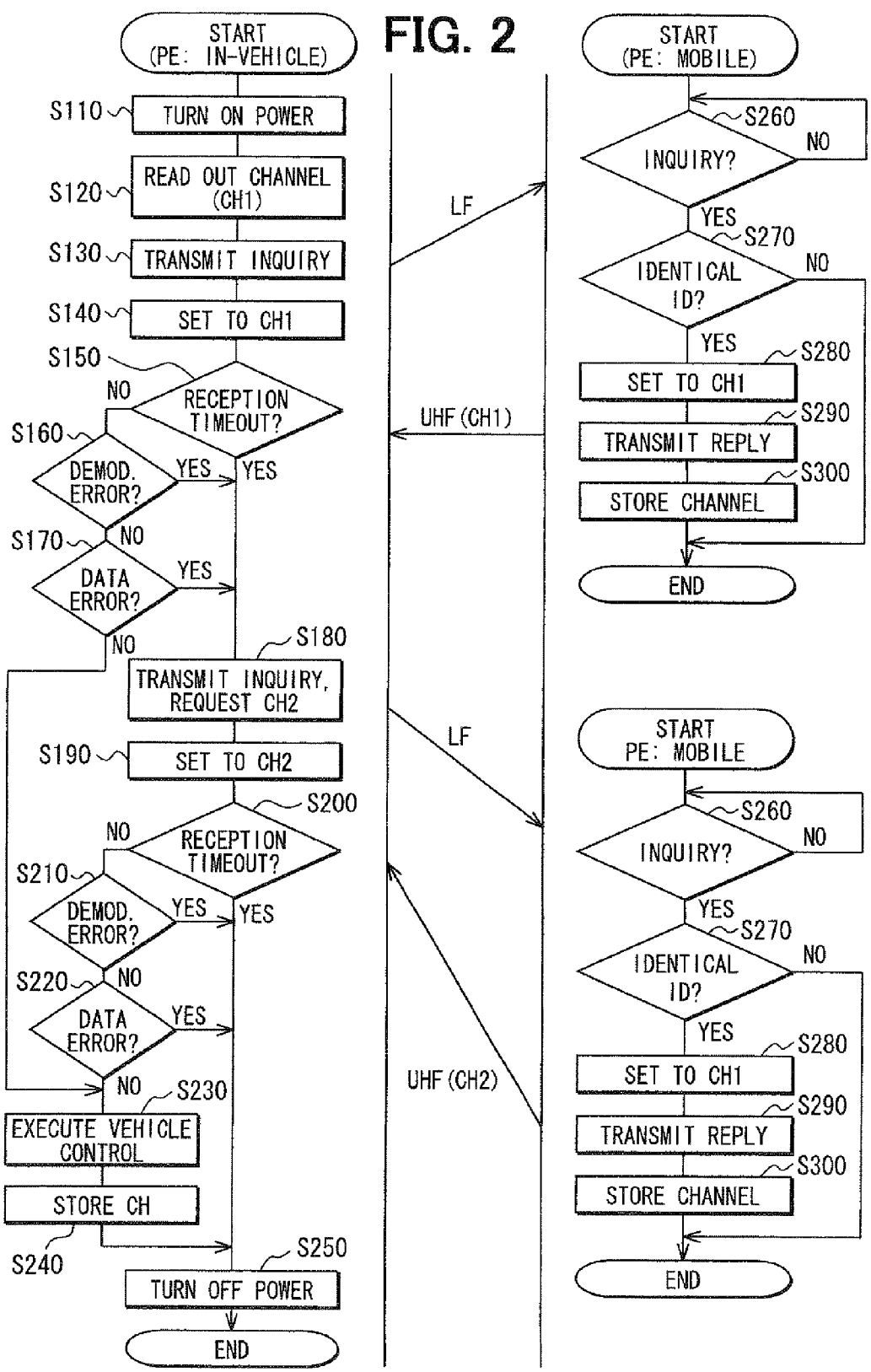

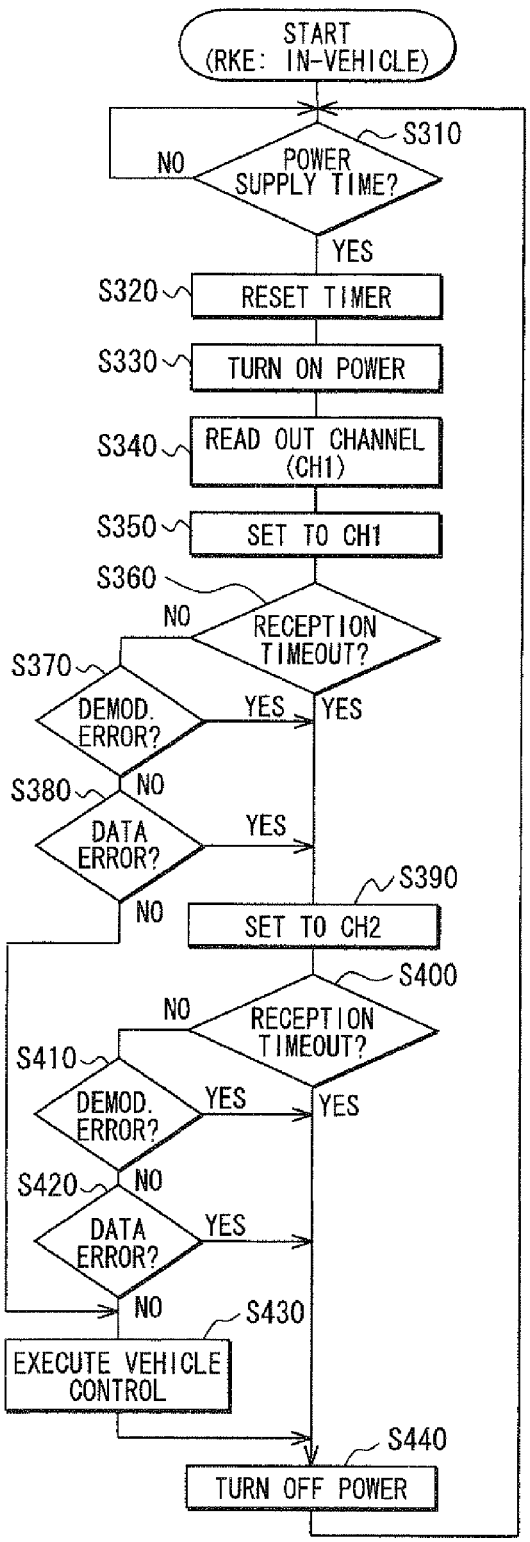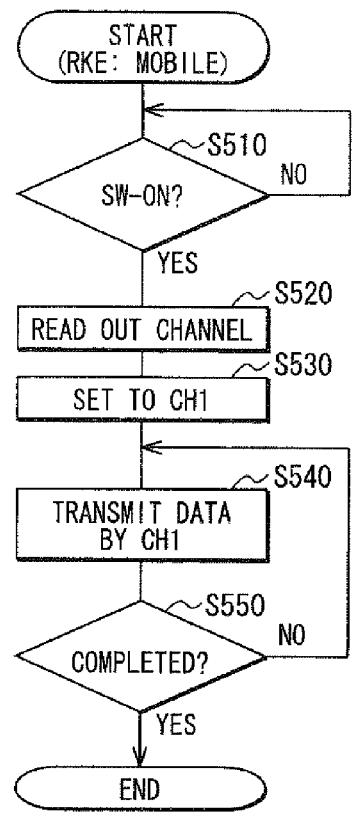

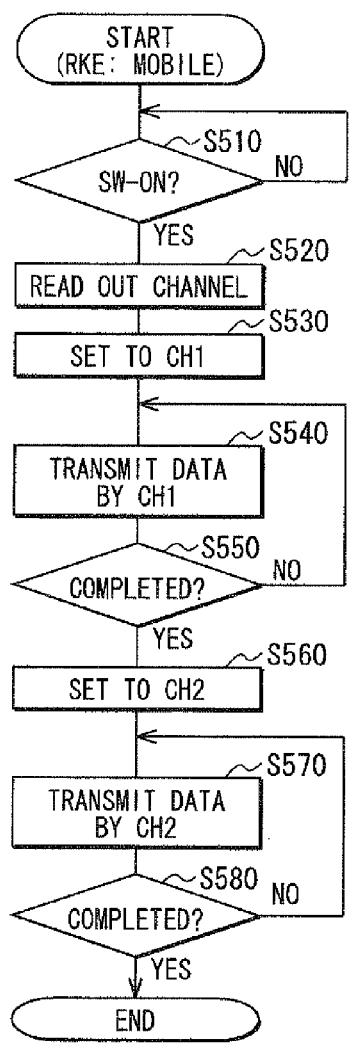
FIG. 5
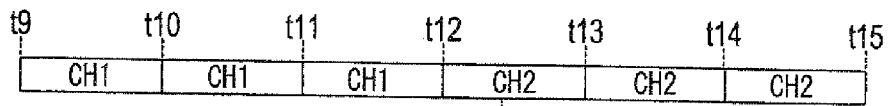
FIG. 6
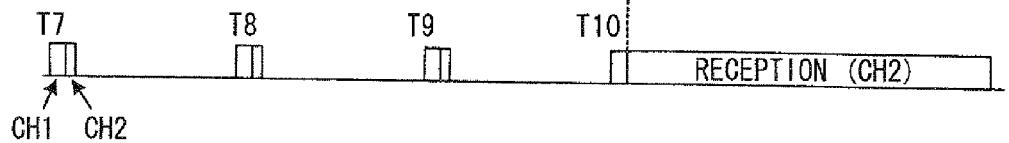

VEHICLE CONTROL SYSTEM AND METHOD, AND COMPONENT DEVICES

CROSS REFERENCE TO RELATED APPLICATION

This application is based on and incorporates herein by reference Japanese Patent Application No. 2007-8501 filed on Jan. 17, 2007.

TECHNICAL FIELD

The present exemplary embodiment relates to a vehicle control system and method, and more particularly to a keyless system and method that remotely controls a vehicle.

BACKGROUND

In a vehicle, a remote keyless entry system and a smart entry system have been put in practical use, as a keyless entry system. In the remote keyless entry system, when a user of the vehicle depresses a button of a mobile device, an electric wave including information specific to the vehicle is transmitted from the mobile device, and the electric wave is received by an in-vehicle device to conduct authentication of the mobile device, for example, thereby conducting automatic control of vehicle equipment, such as a lock or unlock of a vehicle door. In the smart entry system, when a user who carries the mobile device as an electronic key enters a radio communication area around the vehicle, a reply signal is transmitted from the mobile device, and the reply signal is received by the in-vehicle device to conduct authentication, for example, thereby permitting unlock of a door. The user is allowed to unlock the door, for example, by merely operating a switch that is disposed outside of the door.

In the above keyless entry system, use of plural frequency channels is proposed in order to ensure certainty of a communication. For example, JP 4-315681A proposes a communication system, in which the user operates a changeover switch that is disposed in the mobile device to change over the frequency channels of the electric wave that is transmitted from the mobile device. However, this method is not practical, because the frequency channel of the transmission electric wave is changed over based on the operation of the changeover switch by the user. The user must always recognize whether the communication has been successfully conducted or not.

Under the circumstances, EP 1362753 A1 proposes a communication system in which, for example, when the in-vehicle device detects the noise level of the frequency channel of the transmission electric wave, and determines that the communication is jammed by the noise, the mobile device changes over the frequency channel of the transmission electric wave. Thus, the communication is automatically conducted through the frequency channel that is small in the noise level, thereby making it highly possible to successfully perform the communication.

However, when the in-vehicle device detects the noise level in addition to the original communication, a ratio of a time during which the in-vehicle device is activated to operate to a unit time becomes large. As a result, the power consumption of the in-vehicle device as well as the overall system is increased. On the other hand, the keyless entry system frequently operates in a state where an engine of the vehicle is not driven, that is, the keyless entry system operates by only a supply voltage from a battery power supply. It is not preferred that, the power consumption is increased.

Also, in the remote keyless entry system, because the user depresses the button of the mobile device to transmit the transmission electric wave from the mobile device, the in-vehicle device cannot determine when the transmission electric wave is transmitted from the mobile device. For this reason, for example, it is assumed that the transmission electric wave is transmitted from the mobile device when the in-vehicle device is in the noise level detecting operation. In this case, not only the in-vehicle device misses an opportunity to receive the transmission electric wave, but also the in-vehicle device may erroneously detects the transmission electric wave level as the noise level as the occasion demands, and changes the frequency channel in error.

That is, when the frequency channel of the communication is changed over when the noise level is detected and it is determined that the communication is jammed by the noise, the communication between the mobile device and the in-vehicle device is not successfully conducted although the power consumption is increased.

SUMMARY

It is therefore an object of the present exemplary embodiment to provide a keyless system that remotely controls a vehicle which ensures a more stable communication and suppresses an increase in power consumption to a minimum.

According to one aspect, a vehicle control system has a mobile device and an in-vehicle device. The mobile device is carried by a user of a vehicle to transmit a first radio signal for remotely controlling vehicle equipment by using a plurality of frequency channels that are different in frequency from each other. The in-vehicle device is mounted in the vehicle to conduct radio communication with the mobile device to control the vehicle equipment.

The in-vehicle device selects a given frequency channel from the plurality of frequency channels, transmits a second radio signal including information on the selected frequency channel to the mobile device, receives the first radio signal that is transmitted from the mobile device through the selected frequency channel, determines whether the first radio signal is received, and updates and stores the information on the frequency channel used to receive the first radio signal in an in-vehicle memory when the first radio signal has been received successfully. The in-vehicle device selects a frequency channel which is the same as the frequency channel stored in the in-vehicle memory when the information on the frequency channel is stored in the in-vehicle memory.

The mobile device selects a given frequency channel from the plurality of frequency channels, transmits the first radio signal through the selected frequency channel, receives the second radio signal, determines whether the second radio signal has been received, and updates and stores the information on the frequency channel included in the second radio signal in the mobile memory when the second radio signal has been received successfully. The mobile device selects a frequency channel which is identified by the frequency channel information included in the second radio signal when the second radio signal is received, and selects a frequency channel which is identified by the frequency channel information stored in the mobile memory when a given operation button that is disposed in the mobile device is operated by the user.

According to another aspect, a vehicle control method for controlling vehicle equipment is performed by radio communications through a plurality of frequency channels between a mobile device carried by a user and an in-vehicle device mounted in a vehicle. In this control method, the in-vehicle device selects one of the plurality of frequency channels stored in an in-vehicle memory, and transmits an inquiry signal through the selected frequency channel. The inquiry signal includes information on the selected frequency channel. The mobile device determines whether the inquiry signal has been received. When the mobile device determines that the inquiry signal has been received successfully, the mobile device transmits a reply signal and stores the information included in the inquiry signal in a mobile memory thereby to transmit a next reply signal by selecting one of the frequency channel based on the information stored in the mobile memory. The in-vehicle device determines whether the reply signal has been received successfully. When the in-vehicle device determines that the reply signal has been received successfully, the in-vehicle device stores the frequency channel used to receive the reply signal in the in-vehicle memory thereby to be selected as a selected frequency channel in transmitting a next inquiry signal.

BRIEF DESCRIPTION OF THE DRAWINGS

The above and other objects, features and advantages of the present invention will become more apparent from the following detailed description made with reference to the accompanying drawings. In the drawings:

FIG. 2 is a flowchart showing a process that is executed in a mobile device and an in-vehicle device in a passive entry system;

FIGS. 3A and 3B are flowcharts showing processes that are executed in the mobile device and the in-vehicle device in a remote keyless entry system;

FIG. 5 is a flowchart showing a process of a modified example that is executed by the mobile device in the remote keyless entry system; and FIG. 6 is a diagram showing operation of a remote keyless entry system according to the modified example.

DETAILED DESCRIPTION OF THE PREFERRED EMBODIMENTS

Figure 1:
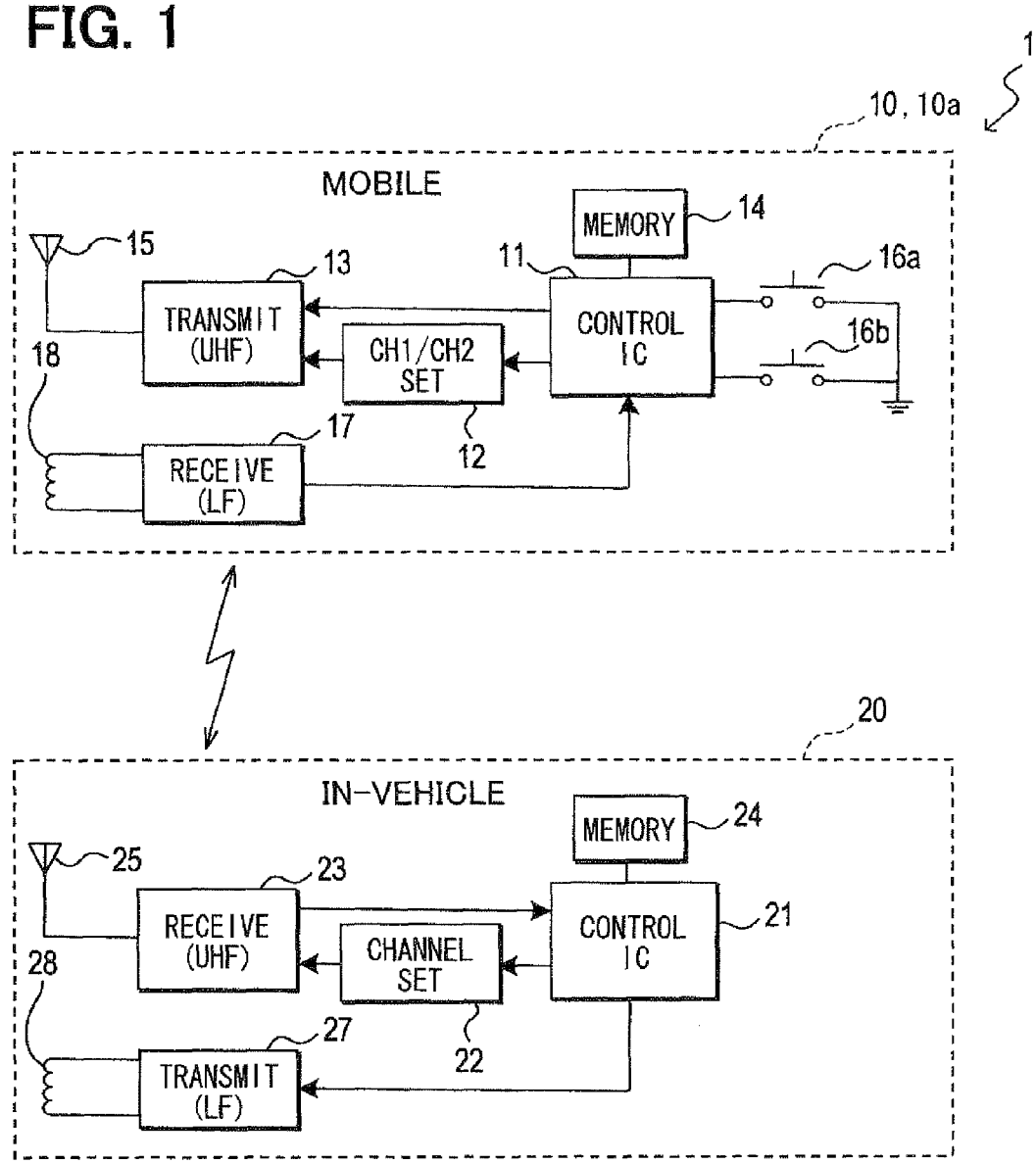
FIG. 1 is a block diagram showing a keyless entry system according to an embodiment of the present invention.

According to an embodiment, a keyless entry system 1 is shown in FIG. 1 and has the functions of a remote keyless entry system (RKE system) and a smart entry system (passive entry system or PE system). The keyless entry system 1 includes a mobile device 10 that is carried by a user of a vehicle, and an in-vehicle device 20 that is mounted in the vehicle.

First, the mobile device 10 includes a control IC 11 that controls the function of the mobile device 10, an antenna 15 for transmitting a radio signal to the in-vehicle device 20, and a transmitter unit 13 that generates the radio signal to supply the radio signal to the antenna 15. The mobile device 10 also includes a channel setting unit 12 that transmits the radio signal on a desired frequency channel, and a memory unit 14 that is formed of a memory such as a RAM, and updates and stores information on the frequency channel therein. The mobile device 10 further includes a button type lock switch 16a that is depressed when a door of the vehicle as vehicle equipment is to be locked, a button type unlock switch 16b that is depressed when a door of the vehicle is to be unlocked, an antenna 18 for receiving a signal that is transmitted from the in-vehicle device 20, and a receiver unit 17 that receives a received signal that has been received by the antenna 18.

The in-vehicle device 20 includes a control IC 21 that controls the function of the in-vehicle device 20, an antenna 25 for receiving the radio signal that is transmitted from the mobile device 10, a receiver unit 23 that receives a received signal which has been received by the antenna 25, a channel setting unit 22 that receives the radio signal from the mobile device 10 on a desired frequency channel, a memory unit 24 that is formed of a memory such as a RAM, and updates and stores information on the frequency channel, an antenna 28 for transmitting the radio signal to the mobile device 10, and a transmitter unit 27 that generates the radio signal to supply the radio signal to the antenna 28.

The radio signal that is transmitted from the mobile device 10 is a signal of the UHF band (300 MHz to 3 GHz). On the other hand, the radio signal that is transmitted from the in-vehicle device 20 is a signal of an LF band (30 kHz to 300 kHz).

In the RKE system, the user of the vehicle depresses the lock switch 16a or the unlock switch 16b of the mobile device 10, thereby making it possible to lock or unlock the door at a place apart from the vehicle. Also, in the PE system, for example, when the user of the vehicle touches a door handle in a state where the user carries the mobile device 10 and approaches the vehicle, the door is unlocked.

In the PE system, the in-vehicle device 20 periodically transmits the radio signal including the information on the frequency channel to the environment from the antenna 28. More specifically, the following process is periodically executed in the in-vehicle device 20.

First, the control IC 21 reads the information on the frequency channel that has been stored in the memory unit 24 from the memory unit 24, and outputs a digital signal including information on the read frequency channel to the transmitter unit 27. For example, the information on the frequency channel is stored in the memory unit 24 as default before shipment. Also, the control IC 21 updates and stores the information on the frequency channel in the memory unit 24.

The transmitter unit 27 modulates a given frequency according to a digital signal that has been input from the control IC 21 into a carrier (LF band, for example AM modulation or FM modulation), and supplies the signal that has been modulated to the antenna 28.

Through the above processing, the radio signal including the information on the frequency channel is periodically transmitted. Hereinafter, the radio signal (radio signal including the information on the frequency channel) which is periodically transmitted from the in-vehicle device 20 in the PE system is called "inquiry signal". Also, the inquiry signal also includes an ID ("vehicle ID") for identifying the vehicle.

In the mobile device 10, when the inquiry signal from the in-vehicle device 20 is received by the antenna 18, the received signal (that is, the inquiry signal) is input to the receiver unit 17. The receiver unit 17 demodulates the received signal, and outputs the demodulated signal to the control IC 11.

The control IC 11 checks whether a vehicle ID represented by the demodulated signal is identical with a vehicle ID that has been stored in the mobile device 10 in advance or not. The control IC 11 conducts the following process when the control IC 11 determines that those vehicle IDs are identical with each other.

That is, the control IC 11 outputs the information on the frequency channel which is represented by the demodulated signal that has been input from the receiver unit 17 to the channel setting unit 12. Also, the control IC 11 outputs a digital signal including an authentication code specific to the mobile device 10 ("authentication digital signal") to the transmitter unit 13.

More specifically, the channel setting unit 12 generates the carrier (UHF band) and outputs the carrier to the transmitter unit 13. The channel setting unit 12 generates the carrier of the frequency channel that is specified by an input from the control IC 11 to output the carrier to the transmitter unit 13. The channel setting unit 12 can generate two kinds of carriers which are different in the frequency from each other. Hereinafter, the two kinds of frequency channels are called "channel 1 (CH1)" and "channel 2 (CH2)", respectively.

The transmitter unit 13 modulates the carrier that is input from the channel setting unit 12 according to an authentication digital signal that is input from the control IC 11, and supplies the modulated signal to the antenna 15. In this situation, the transmitter unit 13 amplifies the modulated signal, and supplies the amplified signal to the antenna 15.

Hereinafter, the radio signal that is transmitted from the mobile device 10 according to the inquiry signal from the in-vehicle device 20 in the PE system is called "reply signal". In this embodiment, when the mobile device 10 transmits the reply signal, the mobile device 10 updates and stores the information on the frequency channel which is used for transmission of the reply signal in the memory unit 14.

In the in-vehicle device 20, when the reply signal from the mobile device 10 is received by the antenna 25, the received signal (that is, the reply signal) is input to the receiver unit 23. The receiver unit 23 demodulates the received signal, and outputs the demodulated signal to the control IC 21.

The control IC 21 checks the authentication code represented by the demodulated signal which has been input from the receiver unit 23 with the authentication code specific to the vehicle. Then, when the control IC 21 determines that those authentication codes are identical with each other ("identity is established"), the control IC 21 conducts a process for a given vehicle control. For example, the door is unlocked by only touching the door handle.

Also, in this embodiment, the control IC 21 updates and stores the information on the frequency channel which is used for the present reception of the reply signal in the memory unit 24 when the identity is established.

On the other hand, the control IC 21 outputs the information on another frequency channel which is different from the frequency channel used for the present reception of the reply signal to the transmitter unit 27. The following process is omitted from the description because the process is identical with the process described above.

FIG. 2 shows processing that is executed by the control IC 11 of the mobile device 10 and the control IC 21 of the in-vehicle device 20 in the PE system, respectively. This processes is periodically executed, respectively. In the mobile device 10, processing of steps (S) 260 to 300 is periodically executed. In this example, the processing of S260 to S300 is executed twice in the mobile device 10.

First, the control IC 21 of the in-vehicle device 20 starts a supply of an electric power (voltage) to the receiver unit 23 in S110. In the following description, that the supply of a voltage starts is called "power supply turns on", and that the supply of a voltage stops is called "power supply turns off". Then, the processing proceeds to S120, and the information on the frequency channel which has been stored in the memory unit 24 is read from the memory unit 24. In this example, it is assumed that information representative of channel CH1 is stored in the memory unit 24.

Thereafter, the processing proceeds to S130, and an inquiry signal including the information on the CH1 which has been read from the memory unit 24 is transmitted. Also, as described above, the inquiry signal includes the vehicle ID. Then, the processing proceeds to S140, and the information representative of CH1 is output to the channel setting unit 22. In the following description, that the reply signal from the mobile device 10 is received by a desired frequency channel in the in-vehicle device 20 is also called "reception channel is set (to a desired frequency channel)". In S140, the reception channel is set to CH1.

Subsequently, the processing proceeds to S150, and it is checked whether the reply signal that is transmitted in S290 that will be described later can be received from the mobile device 10 or not (the reception timeout or not). In this example, the reception timeout means that the reply signal cannot be received within a given period of time.

When it is determined that it is not the reception timeout in S150, the processing proceeds to S160, and it is checked whether it is a demodulation error or not. In this example, the demodulation error means that the reply signal from the mobile device 10 cannot be normally demodulated. When it is determined that there is no demodulation error in S160, the processing proceeds to S170, and it is checked whether there is a data error or not. The data error means that the authentication code which is included in the demodulation signal of the reply signal from the mobile device 10 is not identical with the authentication code specific to the vehicle. For example, there is a case in which an error occurs in the demodulated signal, and those authentication codes are not identical with each other, and a case in which the authentication code different from the authentication code specific to the vehicle is received.

When it is determined that there is no data error in S170, that is, the authentication code included in the reply signal is identical with the authentication code specific to the vehicle, the processing proceeds to S230. In S230, a given vehicle control process is executed. Then, the processing proceeds to S240, and information (information on CH1 in this example) on a given channel used for the present communication (used for receiving the reply signal) is stored in the memory unit 24. Subsequently, the processing proceeds to S250, and the power supply of the receiver unit 23 is turned off. Thereafter, this processing is terminated.

On the other hand, when it is determined that the reception timeout is made (a given period of time elapses after waiting for the reception) in S150, when it is determined that there is a demodulation error in S160, or when it is determined that there is a data error in S170, the processing proceeds to S180. The inquiry signal including the information of CH2 is transmitted in S180. Subsequently, the processing proceeds to S190, and the reception channel is set to CH2. Then, it is checked whether the reception timeout is made or not in subsequent S200. When it is determined that the reception timeout is not made, the processing proceeds to S210.

It is checked whether there is the demodulation error or not in S210. When it is determined that there is no demodulation error, the processing proceeds to S220. It is checked whether there is the data error or not, in S220. When it is determined that there is no data error, the processing proceeds to S230.

On the other hand, when it is determined that the reception timeout is made in S200, and it is determined that there is the demodulation error in S210 or it is determined that there is the data error in S220, the processing proceeds to S250. Then, the control IC 11 of the mobile device 10 first checks whether the inquiry signal from the in-vehicle device 20 has been received or not in S260. When it is determined that no inquiry signal has been received, the processing is returned to S260 (waiting for the reception). The inquiry signal is transmitted from the in-vehicle device 20 in the above S130.

On the other hand, when it is determined that the inquiry signal has been received in S260, the processing proceeds to S270. It is checked whether the vehicle ID that is included in the inquiry signal is identical with the vehicle ID that has been stored in the mobile device 10 in advance or not. When it is determined that those vehicle IDs are not identical with each other, the processing is terminated as it is.

When it is determined that those vehicle IDs are not identical with each other in S270, the processing proceeds to S280, and information representative of CH1 is output to the channel setting unit 12. In the following description, that the reply signal is transmitted by a desired frequency channel in the mobile device 10 is also called "the transmission channel is set (to the desired frequency channel)". In S280, the transmission channel is set to CH1.

Subsequently, the processing proceeds to S290, and the reply signal is transmitted by CH1 that is set to the transmission channel in S280. As described above, the reply signal includes an authentication code specific to the mobile device 10. Then, the processing proceeds to S300, and the information representative of CH1 is updated and stored in the memory unit 14.

Thereafter, the processing of S260 to S300 is periodically executed. For example, in this example, the processing of S260 to S300 is executed in response to the inquiry signal that is transmitted from the mobile device 10 in the above S180, whose description will be omitted.

Subsequently, the RKE system will be described in more detail. In this example, it is assumed that the lock switch 16a shown in FIG. 1 is depressed by the user. A case in which the unlock switch 16b is depressed will be omitted from description because the operation is identical with that when the lock switch 16a is depressed.

When the lock switch 16a is depressed by the user, the control IC 11 outputs a digital signal including a lock instruction code for instructing the door to be locked ("lock digital signal") to the transmitter unit 13.

Also, the control IC 11 reads the information on the frequency channel which has been stored in the memory unit 14, and outputs the information on the read frequency channel to the channel setting unit 12. For example, the information on the frequency channel is stored in the memory unit 14 as default before shipment. Also, as described above, the control IC 11 updates and stores the information on the frequency channel in S300 of FIG. 2.

The transmitter unit 13 modifies a carrier that is input from the channel setting unit 12 (a carrier of the frequency channel which is input from the control IC 11 to the channel setting unit 12) according to the lock digital signal that is input from the control IC 11, and then supplies the modulated signal to the antenna 15. The radio signal that is transmitted to the in-vehicle device 20 from the mobile device 10 in the RKE system is called "RKE radio signal".

Then, in the in-vehicle device 20, an operating voltage for operating the receiver unit 23 is intermittently supplied to the receiver unit 23. More specifically, the control IC 21 controls the supply of the operating voltage.

When the supply of the operating voltage to the receiver unit 23 starts, the control IC 21 reads the information on the frequency channel which has been stored in the memory unit 24, and outputs the information on the read frequency channel to the channel setting unit 22.

Then, upon receiving the RKE radio signal from the mobile device 10 by the antenna 25, the received signal (that is, the RKE radio signal) is input to the receiver unit 23. More specifically, the channel setting unit 22 generates a signal of a given frequency, and outputs the generated signal to the receiver unit 23. The channel setting unit 22 generates the signal of the given frequency for demodulating the received signal that is received by the frequency channel specified by an input from the control IC 21, and outputs the generated signal to the receiver unit 23.

The receiver unit 23 mixes the received signal that has been received by the antenna 25 with the signal of the given frequency which has been input from the channel setting unit 22, and converts the received signal into an intermediate frequency signal. Then, the receiver unit 23 extracts only the intermediate frequency signal through a band pass filter that allows only the intermediate frequency signal to pass therethrough, demodulates the intermediate frequency signal, and outputs the demodulated signal to the control IC 21.

The control IC 21 checks a lock instruction code that is represented by the lock digital signal included in the demodulated signal which has been input from the receiver unit 23 with a code specific to the vehicle which has been stored in advance, and then conducts a process for locking the door when those codes are identical with each other (the identity is established). For example, an instruction for locking the door is output to an electronic control device that controls an actuator which locks or unlocks the door. When the lock instruction code represented by the lock digital signal which has been input from the receiver unit 23 is not identical with the code specific to the vehicle which has been stored in advance, no process for locking the door is conducted.

FIGS. 3A and 3B show processing that are executed by the control IC 11 of the mobile device 10 and the control IC 21 of the in-vehicle device 20 in the RKE system, respectively. The processing shown in FIGS. 3A and 3B are periodically executed, respectively.

The control IC 21 of the in-vehicle device 20 checks whether it is a power supply time or not by checking whether a measured value (timer value) of a timer not shown for measuring a supply stop period of a voltage to the receiver unit 23 is equal to or higher than a predetermined value or not in S310. When it is determined that the timer value is lower than the predetermined value in S310, the processing is returned to S310.

On the other hand, when it is determined that the timer value is equal to or higher than the predetermined value in S310, the processing proceeds to S320, and the timer value is reset. Also, the processing proceeds to S330, and the power supply of the receiver unit 23 turns on.

Thereafter, the processing proceeds to S340, and the information on the frequency channel which has been stored in the memory unit 24 is read from the memory unit 24. In this situation, it is determined that the reception is established in the above S150 to S170, or S200 to S220 (NOs in S150 to S170, and in S200 to S220), and the information representative of CH1 is stored in the memory unit 24 (S240).

Then, the processing proceeds to S350, and the reception channel is set to CH1. Then, the processing proceeds to S360, and it is checked whether the reception timeout is made or not. When it is determined that no reception timeout is made, the processing proceeds to S370.

It is checked whether there is the demodulation error or not in S370. When it is determined that there is no demodulation error, the processing proceeds to S380. It is checked whether there is the data error or not in S380. When it is determined that there is no data error, the processing proceeds to S430. In S430, a given vehicle control process is executed. Then, the processing proceeds to S440, and the power supply of the receiver unit 23 turns off. Thereafter, the processing is returned to S310.

On the other hand, when it is determined that the reception timeout is made in S360, when it is determined that there is the demodulation error in S370 or there is the data error in S380, the processing proceeds to S390. The reception channel is set to CH2 in S390. Then, the processing proceeds to S400.

It is checked whether the reception timeout is made or not in S400. When it is determined that no reception timeout is made, the processing proceeds to S410. It is checked whether there is the demodulation error or not in S410. When it is determined that there is no demodulation error, the processing proceeds to S420. It is checked whether there is the data error or not in S420. When it is determined that there is no data error, the processing proceeds to S430. On the other hand, when it is determined that the reception timeout is made in S400, when it is determined that there is the demodulation error in S410 or there is the data error in S420, the processing proceeds to S440.

Then, the control IC 11 of the mobile device 10 checks whether the lock switch 16a or the unlock switch 16b has been depressed or not in S510. When it is determined that the switch is not depressed, the processing is returned to S510.

On the other hand, when it is determined the lock switch 16a or the unlock switch 16b is depressed in S510, the processing proceeds to S520. The information on the frequency channel which has been stored in the memory unit 14 is read from the memory unit 14. In this example, it is assumed that the information representative of CH1 is stored in the memory unit 14 through the above process of S300. Then, the processing proceeds to S530, and the transmission channel is set to CH1.

Then, the processing proceeds to S540, and the RKE radio signal is transmitted by CH1 that is set to the transmission channel in S530. Thereafter, the processing proceeds to S550. It is checked whether the transmission of the RKE radio signal has been completed or not. When it is determined that the transmission has not yet been completed, the processing is returned to S540. On the other hand, when it is determined that the transmission has been completed in S550, the process is terminated as it is.

Figure 4A:
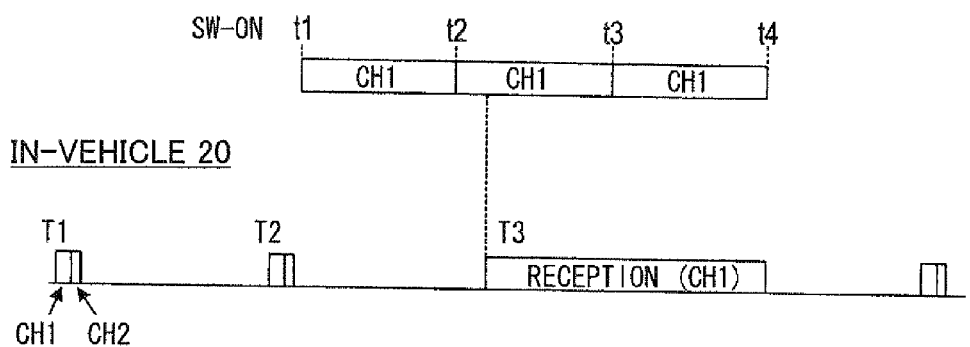
FIGS. 4A and 4B are diagrams showing operations of the remote keyless entry system according to the embodiment.
Figure 4B:
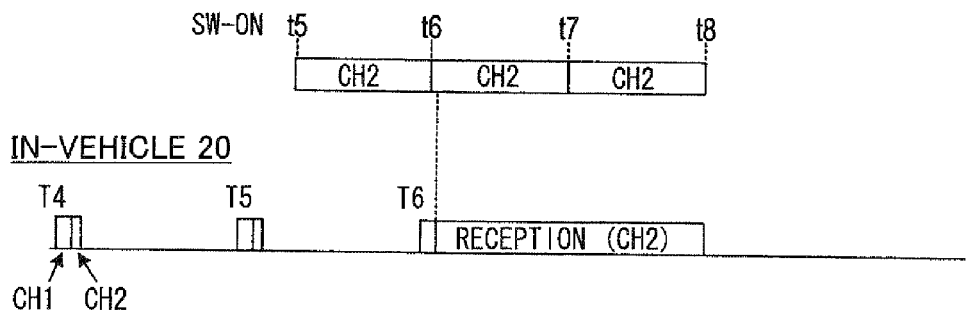

The operation of the above RKE system will be described with reference to FIGS. 4A and 4B. FIG. 4A is an example in which the information on CH1 is stored in the memory unit 14 and the memory unit 24. FIG. 4B is an example in which the RKE radio signal is transmitted, for example, from an auxiliary mobile device 10a, which is separate from the mobile device 10 shown in FIG. 1. In the example, the information on CH2 is stored in the memory unit 14 of the auxiliary mobile device 10a, and the information on CH1 is stored in the memory unit 24 of the in-vehicle device 20.

As shown in FIG. 4A, when the lock switch 16a or the unlock switch 16b is operated by the user, for example, at a time t1 (YES in S510), the RKE radio signal is transmitted from the mobile device 10 by CH1 (S520 to S550). In this situation, frames of the same information are continuously transmitted according to the RKE radio signal (three frames in an example of FIG. 4A). More specifically, a succeeding frame (second frame) is transmitted at time t2, and a succeeding frame (third frame) is further transmitted at time t3 (transmission is completed at a time t4). Then, the lock instruction code or the unlock instruction code is included in the respective frames, respectively. The lock instruction code is described above, and the unlock instruction code is a code that instructs the door to be unlocked.

The number of frames continuously transmitted is designed in such a manner that one or more frames can be always received, that is, one transmission can be always received even though the radio signal is transmitted at any time point with respect to the intermittent time points of the in-vehicle device 20 due to a periodic time or a radio communication speed at which the in-vehicle device 20 intermittently starts.

On the other hand, in the in-vehicle device 20, when the power supply of the receiver unit 23 turns on, for example, at time T1 (S330), the RKE radio signal from the mobile device 10 is waited for by CH1 (S340 and S350). Then, when the reception has not been established by CH1 (YES in S360, S370 and S380), the reception channel is changed over to CH2 (S390), and the RKE radio signal is waited for by CH2.

Thereafter, when the reception has not been established by CH2 (YES in S400, S410 and S420), the power supply of the receiver unit 23 turns off (S440). Then, the power supply of the receiver unit 23 again turns on at the time T2 where a time elapses by an intermittent interval shown in FIG. 4A (YES in S310) (S330), and the RKE radio signal is waited for at CH1 as described above (S340 and S330).

In the example of FIG. 4A, when the power supply of the receiver unit 23 turns on at time T3 (S330), the RKE radio signal is transmitted from the mobile device 10 at CH1 (YES in S520 to S550), and the RKE radio signal is received at CH1 in the in-vehicle device 20 (NO in S360 to S380).

In FIG. 4B, when the lock switch 16a or the unlock switch 16b of the auxiliary mobile device 10a is operated by the user, for example, at time t5 (YES in S510), the RKE radio signal is transmitted from the auxiliary mobile device 10a at CH2 (S520 to S550).

On the other hand, when the power supply of the receiver unit 23 turns on in the in-vehicle device 20, for example, at time T4 (S330), the RKE radio signal from the mobile device 10 is first waited for at CH1 as described above (S340 and S350). Similarly, in this case, when the reception is not established in CH1 (YES in S360, S370 and S380), the reception CH is changed over to CH2 (S390). Then, in the example of FIG. 4B, when the power supply of the receiver unit 23 turns on, for example, at time T6, and thereafter the reception channel is changed over to CH2, the RKE radio signal from the auxiliary mobile device 10a is received in the in-vehicle device 20 (NO in S400 to S420).

That is, the reception channel changes over in the in-vehicle device 20. Therefore, a communication is established even in the case where the channels that are stored in the auxiliary mobile device 10a and the in-vehicle device 20, respectively are different from each other, for example, when the auxiliary mobile device 10a is used as shown in FIG. 4B.

In the keyless entry system 1 according to this embodiment, the information on the frequency channel in which the identity is established in the PE system is stored in the memory unit 24 of the in-vehicle device 20. The stored information on the frequency channel is transmitted to the mobile device 10 together with a succeeding inquiry signal, and a communication is conducted by the frequency channel. That is, because a succeeding communication is also conducted through the frequency channel where the present communication is normally conducted in the PE system, the possibility that the communication is normally conducted is improved.

When the identity is not established regarding the frequency channel that is stored in the memory unit 24, the frequency channel is changed over. As a result, the probability that the identity is established, that is, the possibility that the communication is normally conducted is improved. In addition, the power consumption can be suppressed to the minimum by changing over the frequency channel first time when the identity is not established.

In the mobile device 10, the frequency channel that has been used for transmitting the reply signal in response to the inquiry signal from the in-vehicle device 20 is stored in the memory unit 14 in advance. When the lock switch 16a or the unlock switch 16b is depressed, the RKE radio signal is transmitted through the frequency channel that has been stored in the memory unit 14. For that reason, in the RKE system, it is possible to first transmit the RKE radio signal through the frequency channel where the identity is established in the PE system from the mobile device 10. Accordingly, in the RKE system, it is possible to improve the possibility that the communication is normally conducted.

The in-vehicle device 20 waits for the radio signal from the mobile device 10 through the frequency channel that has been stored in the memory unit 24. Thereafter, the in-vehicle device 20 waits for the radio signal on another frequency channel. As a result, even if the radio signal (RKE radio signal) is transmitted, for example, from the auxiliary mobile device 10a on a frequency channel different from the frequency channel that has been stored in the memory unit 24, it is possible to establish the reception.

Because the mobile device 10 continuously transmits the frames of the same information, the probability that the frames are received by the in-vehicle device 20 is improved. That is, the certainty of the communication is improved.

In this embodiment, the control IC 21, the channel setting unit 22, and the processing of S120, S140, S190, S340, S350 and S390 operate as channel selecting means at the in-vehicle. The transmitter unit 27 and the processing of S130 and S180 operate as transmitting means at the in-vehicle, and the antenna 25 and the receiver unit 23 operate as the receiving means at the in-vehicle. The control IC 21 and the processing of steps S150 to S170, S200 to S220, S360 to S380, and S400 to S420 correspond to the reception determining means at the in-vehicle. The control IC 21, the memory unit 24, and the processing of S240 operate as reception channel storing means, and the control IC 11, the channel setting unit 12, and the processing of S280, S520, and S530 operate as the channel selecting means at the mobile. The antenna 15, the transmitter unit 13, and the processing of S290, S540 and S550 operate as transmitting means at the mobile, and the antenna 18 and the receiver unit 17 operate as receiving means at the mobile. The control IC 11 and the processing of Steps S260 and S270 correspond to the reception determining means at the mobile, and the control IC 11, the memory unit 14, and the processing of S300 operate as transmission channel storing means.

The mobile device 10 in the above embodiment may be modified to perform the processing as shown in FIG. 5.

In this example, the control IC 11 in the mobile device 10 executes the processing shown in FIG. 5 instead of the processing of the mobile device shown in FIG. 3B in the RKE system. The processing of FIG. 5 is different from the processing of FIG. 3B in that the processing of S560 to S580 is added to the processing of S550.

More specifically, in this processing, when it is determined that the transmission of data has been completed in S550, the processing further proceeds to S560, and the transmission channel is set to CH2. Then, the processing proceeds to S570, and the RKE radio signal is transmitted on CH2. Then, the processing proceeds to S580, and it is checked whether the transmission of the RKE radio signal has been completed or not. When it is determined that the transmission has not yet been completed, the processing is returned to S570. On the other hand, when it is determined that the transmission has been completed in S580, this processing is terminated.

Thus, in this modified example, the mobile device 10 transmits the RKE radio signal on both of CH1 and CH2 in the RKE system. This modified example will be further described with reference to FIG. 6.

The mobile device 10 continuously transmits the frames (three frames in this example) of the same information according to the RKE radio signal of CH1, for example, at times t9 to t12 (YES in S550). Thereafter, the mobile device 10 continuously transmits the frames (three frames in this example) of the same information according to the RKE radio signal of CH2, for example, at times t12 to t15 (S570). On the other hand, the in-vehicle device 20 operates as described above and shown in FIGS. 4A and 4B.

In the example of FIG. 6, the power supply of the receiver unit 23 in the in-vehicle device 20 turns on, for example, at time T10 (S330). Thereafter, when the reception channel is changed over to CH2 (S390), the RKE radio signal that has been transmitted from the mobile device 10 on CH2 is received in the in-vehicle device 20 (NO in S400 to S420).

According to this modified example, even if a time elapses from the previous PE communication and the frequency channel that has been stored in the memory unit 14 at that time is subjected to an interfering wave at this time in the RKE system, it is possible to surely conduct the communication. Also, the mobile device 10 first uses the frequency channel that has been stored in the memory unit 14, and transmits the RKE radio signal, thereby making it possible to minimize the deterioration of the response due to the two-channel transmission.

An embodiment of the present invention has been described above. However, the present invention is not limited to the above embodiment, but various changes may be made without departing from the scope of the invention.

For example, the number of frequency channels may be three or more. If many frequency channels are provided to be used for communications, it is preferred to assign different priorities to the plurality of frequency channels by learning reception conditions of the first radio signal by the in-vehicle unit 20 and select the frequency channel in an order of higher priority.

The mobile device 10 may be provided with a switch for locking or unlocking the trunk, or a switch for allowing an alarm to be issued from the vehicle, in addition to the lock switch 16a and the unlock switch 16b.

Further, the above embodiment may be modified to, for example, a system that starts an engine from a remote position.

The memory unit 14 and the memory unit 24 may be formed of a nonvolatile memory (for example, EEPROM).

The on/off operation of the power supply of the receiver unit 23 in the in-vehicle device 20 may be controlled by an external electronic device other than the control IC 21.

In the above embodiment, it is checked whether the reception is established or not (whether the identity is established or not), by using the authentication code in the in-vehicle device 20. However, any other methods may be used. Similarly, in the mobile device 10, it is checked whether the reception is established or not (whether the identity is established or not) by using the ID. However, any other methods may be used.

Further, in the above embodiment, the channel setting unit 12 generates the carrier. Alternatively, a circuit that generates the carrier can be incorporated into the transmitter unit 13. The channel setting unit 12 can be so designed as to control the transmitter unit 13 so that a desired carrier is generated by the transmitter unit 13. Also, in the above embodiment, the channel setting unit 22 generates the signal of the given frequency. Alternatively, a circuit that generates the signal of the given frequency can be incorporated into the receiver unit 23. The channel setting unit 22 can be so designed as to control the receiver unit 23 so that a desired signal of the given frequency is generated by the receiver unit 23.

Further, in the above embodiment, the in-vehicle device 20 changes over the reception channel in the RKE system as shown in FIGS. 3A, 3B, 4A and 4B. Alternatively, the reception channel may not be changed over. As a result, it is possible to further suppress the power consumption.

Further, in the above embodiment, after the reply signal has been transmitted in the mobile device 10, for example, in S290, the information on the frequency channel is stored in S300. The processing of S300 may be executed before the processing of S290 or before the processing of S280 although the processing of S300 must be executed after the processing of S270 (YES in S270). Also, the processing of S280 to S300 can be executed at the same time. In this case, in the processing of S300, the information on the frequency channel included in the inquiry signal needs to be stored.

When the information on the frequency channel included in the inquiry signal is allowed to be stored after the processing of S270 (YES in S270), the information on the frequency channel which is transmitted from the in-vehicle device 20 that is incorporated into another vehicle may not be stored.

What is claimed is:

1. A vehicle control system having a mobile device and an in-vehicle device, the mobile device being carried by a user of a vehicle to transmit a first radio signal for remotely controlling vehicle equipment by using a plurality of frequency channels that are different in frequency from each other, and the in-vehicle device being mounted in the vehicle to conduct a radio communication with the mobile device to control the vehicle equipment, wherein the in-vehicle device includes:
an in-vehicle channel selector configured for selecting a given frequency channel from the plurality of frequency channels;
an in-vehicle transmitter configured for transmitting a second radio signal including information on the frequency channel which is selected by the in-vehicle channel selector to the mobile device;
an in-vehicle receiver configured for receiving the first radio signal that is transmitted from the mobile device through the frequency channel selected by the in-vehicle channel selector;
in-vehicle reception determining logic configured for determining whether the first radio signal is received by the in-vehicle receiver; and
reception channel data storage configured for updating and storing the information on the frequency channel used to receive the first radio signal in an in-vehicle memory, when the in-vehicle reception determining logic determines that the first radio signal has been received,
wherein the in-vehicle channel selector selects a frequency channel which is the same as the frequency channel stored in the in-vehicle memory, when the information on the frequency channel is stored in the in-vehicle memory,
wherein the mobile device includes:
mobile channel selector configured for selecting a given frequency channel from the plurality of frequency channels;
mobile transmitter configured for transmitting the first radio signal through the frequency channel that is selected by the mobile channel selector;
mobile receiver configured for receiving the second radio signal;
mobile reception determining logic configured for determining whether the second radio signal has been received by the mobile receiver; and
transmission channel data storage configured for updating and storing the information on the frequency channel included in the second radio signal in the mobile memory, when the mobile reception determining logic determines that the second radio signal has been received, and
wherein the mobile channel selector selects a frequency channel which is identified by the frequency channel information included in the second radio signal when the second radio signal is received by the mobile receiver, and selects a frequency channel which is identified by the frequency channel information stored in the mobile memory when a given operation button that is disposed in the mobile device is operated by the user;
the mobile channel selector selects the frequency channel which is the same as the frequency channel stored in the in-vehicle memory, when the operation button is operated by the user;
the mobile channel selector further selects a frequency channel different from the selected frequency channel after the mobile transmitter transmits the first radio signal; and
the mobile transmitter repeats the transmission of the first radio signal.

2. The vehicle control system according to claim 1, wherein:
the in-vehicle reception determining logic checks whether identity is established based on data that is included in a demodulated signal of the first radio signal which is transmitted from the mobile device; and
the reception channel data storage updates and stores the information on the frequency channel, when the in-vehicle reception determining logic determines that identity is established.

3. The vehicle control system according to claim 1, wherein:
the in-vehicle channel selector selects a frequency channel different from the frequency channel that is selected previously, when the in-vehicle reception determining logic determines that no first radio signal is received.

4. The vehicle control system according to claim 3, wherein:
the in-vehicle channel selector selects the frequency channel in an order of higher priority, which is assigned to the plurality of frequency channels differently by learning reception conditions of the first radio signal.

5. The vehicle control system according to claim 2, wherein:
the in-vehicle channel selector selects a frequency channel different from the frequency channel that is selected previously, when the in-vehicle reception determining logic determines that no identity is established.

6. The vehicle control system according to claim 1, wherein: the mobile reception determining logic checks whether identity is established based on data that is included in a demodulated signal of the second radio signal which is transmitted from the in-vehicle device; and the transmission channel data storage updates and stores the information on the frequency channel which is included in the second radio signal in the mobile memory, when the mobile reception determining logic determines that identity is established.

7. The vehicle control system according to claim 1, wherein:
data that is included in the first radio signal is identical in all of the selected frequency channels.

8. The vehicle control system according to claim 1, wherein:
the plurality of frequency channels are two frequency channels.

9. A mobile device for conducting radio communication with an in-vehicle device to control vehicle equipment by transmitting a first radio signal through a plurality of channels that are different in frequency from each other, the in-vehicle device being mounted in the vehicle to select a given frequency channel from the plurality of frequency channels, transmit a second radio signal including information on the selected frequency channel to the mobile device, and receive the first radio signal through the selected frequency channel, the mobile device comprising:
a mobile channel selector for selecting a given frequency channel from the plurality of frequency channels;
a mobile transmitter configured for transmitting the first radio signal through the frequency channel that is selected by the mobile channel selector selecting means;
a mobile receiver configured for receiving the second radio signal;
mobile reception determining logic configured for determining whether the second radio signal has been received by the mobile receiver; and
transmission channel data storage configured for updating and storing the information on the frequency channel included in the second radio signal in the mobile memory, when the mobile reception determining logic determines that the second radio signal has been received, and
wherein the mobile channel selector selects a frequency channel which is identified by the frequency channel information included in the second radio signal when the second radio signal is received by the mobile receiver, and selects a frequency channel which is identified by the frequency channel information stored in the mobile memory when a given operation button that is disposed in the mobile device is operated by the user;
the mobile channel selector selects the frequency channel which is the same as the frequency channel stored in the in-vehicle memory, when the operation button is operated by the user;
the mobile channel selector further selects a frequency channel different from the selected frequency channel after the mobile transmitter transmits the first radio signal; and
the mobile transmitter repeats the transmission of the first radio signal.

10. The mobile device according to claim 9, wherein:
the mobile reception determining logic checks whether identity is established based on data that is included in a demodulated signal of the second radio signal which is transmitted from the in-vehicle device; and
the transmission channel data storage updates and stores the information on the frequency channel which is included in the second radio signal in the mobile memory, when the mobile reception determining logic determines that identity is established.

11. The mobile device according to claim 9, wherein:
data that is included in the first radio signal is identical in all of the selected frequency channels.

12. The mobile device according to claim 9, wherein:
the plurality of frequency channels are two frequency channels.

13. A vehicle control system comprising:
a mobile device carried by a user of a vehicle to transmit a radio signal for remotely controlling vehicle equipment by using a plurality of frequency channels that are different in frequency from each other; and
an in-vehicle device mounted in the vehicle to conduct a radio communication with the mobile device to control the vehicle equipment,
wherein the vehicle control system is configured to be operable as a remote keyless entry system, in which the mobile device transmits an instruction signal as the radio signal when a predetermined button thereon is operated by the user and the in-vehicle device controls the vehicle equipment in response to reception of the instruction signal,
wherein the vehicle control system is configured to be operable further as a passive entry system, in which the in-vehicle device periodically transmits an inquiry signal as a radio signal, the mobile device transmits a reply signal as the radio signal in response to reception of the inquiry signal, and the in-vehicle device controls the vehicle equipment in response to reception of the reply signal from the mobile device,
wherein the in-vehicle device includes:
an in-vehicle channel selector configured to select, in the passive entry system, a given frequency channel from the plurality of frequency channels,
an in-vehicle transmitter configured to transmit, in the passive entry system, the radio signal as the inquiry signal including information on the frequency channel selected by the in-vehicle channel selector to the mobile device,
an in-vehicle receiver configured to receive, in the passive entry system, the reply signal transmitted from the mobile device through the frequency channel selected by the in-vehicle channel selector,
in-vehicle reception determining logic configured to determine, in the passive entry system, whether the reply signal is received by the in-vehicle receiver, and
reception channel data storage configured to update and store, in the passive entry system, the information on the frequency channel used to receive the reply signal in an in-vehicle memory, when the in-vehicle reception determining logic determines that the reply signal has been received,
the in-vehicle channel selector selecting, in the passive entry system, a frequency channel which is the same as the frequency channel stored in the in-vehicle memory, when the information on the frequency channel is stored in the in-vehicle memory,
wherein the mobile device includes:
a mobile channel selector configured to select, in the passive entry system, a given frequency channel from the plurality of frequency channels,
a mobile transmitter configured to transmit, in the passive entry system, the reply signal through the frequency channel selected by the mobile channel selector,
mobile receiver configured to receive, in the passive entry system, the reply signal,
a mobile reception determining logic configured to determine, in the passive entry system, whether the inquiry signal has been received by the mobile receiver, and
a transmission channel data storage configured to update and store, in the passive entry system, the information on the frequency channel included in the inquiry signal in a mobile memory, when the mobile reception determining logic determines that the inquiry signal has been received, the mobile channel selector being configured to select, in the passive entry system, a frequency channel which is identified by the frequency channel information included in the inquiry signal when the inquiry signal is received by the mobile receiver, and wherein the mobile transmitter is configured to transmit, in the remote keyless entry system, the instruction signal through the frequency channel selected by the mobile channel selector, the mobile channel selector being configured to select, in the remote keyless entry system, the frequency channel which is a same frequency channel as stored in the mobile memory when the given operation button of the mobile device is operated by the user, the mobile receiver being configured to receive, in the remote keyless entry system, the instruction signal through the frequency channel selected by the in-vehicle channel selector, and the in-vehicle channel selector being configured to select the frequency channel which is the same frequency as stored in the in-vehicle memory.

* * * * *